United States Patent
Chen et al.

(10) Patent No.: US 10,187,560 B2
(45) Date of Patent: Jan. 22, 2019

(54) NOTCHED-SPACER CAMERA MODULE AND METHOD FOR FABRICATING SAME

(71) Applicant: OmniVision Technologies, Inc., Santa Clara, CA (US)

(72) Inventors: Teng-Sheng Chen, Hsinchu (TW); Chia-Yang Chang, Sunnyvale, CA (US); Yi Qin, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 125 days.

(21) Appl. No.: 14/884,390

(22) Filed: Oct. 15, 2015

(65) Prior Publication Data
US 2017/0111560 A1   Apr. 20, 2017

(51) Int. Cl.
*H04N 5/225* (2006.01)

(52) U.S. Cl.
CPC ......... *H04N 5/2257* (2013.01); *H04N 5/2253* (2013.01)

(58) Field of Classification Search
CPC ............................ H04N 5/2257; H04N 5/2253
USPC ........................................................ 348/374
See application file for complete search history.

(56) References Cited

U.S. PATENT DOCUMENTS

| 8,670,055 | B2 | 3/2014 | Tsujino |
| 2003/0042852 | A1 | 3/2003 | Chen |
| 2005/0247976 | A1 | 11/2005 | Ting et al. |
| 2006/0255441 | A1* | 11/2006 | Ohta ...................... G01C 19/56 257/680 |
| 2007/0041106 | A1* | 2/2007 | Chiang .................. G02B 7/026 359/811 |
| 2008/0247064 | A1* | 10/2008 | Chiang .................. G02B 7/025 359/829 |
| 2009/0225431 | A1 | 9/2009 | Lee |
| 2010/0284077 | A1* | 11/2010 | Shyu .................... G02B 13/001 359/503 |
| 2011/0037887 | A1 | 2/2011 | Lee et al. |
| 2013/0258504 | A1* | 10/2013 | Wang ..................... G02B 7/025 359/819 |
| 2013/0258508 | A1* | 10/2013 | Wang ..................... G02B 7/025 359/830 |
| 2014/0064662 | A1* | 3/2014 | Ootorii .................... G02B 6/26 385/33 |

(Continued)

OTHER PUBLICATIONS

U.S. Appl. No. 15/004,584 Non-Final Rejection dated May 15, 2017, 9 pages.

(Continued)

*Primary Examiner* — Antoinette T Spinks
(74) *Attorney, Agent, or Firm* — Lathrop Gage LLP

(57) ABSTRACT

A notched-spacer camera module includes a chip-scale package, a lens plate, a spacer ring, and a glue ring. The chip-scale package has an image sensor and a top surface. The spacer ring includes a glue gate having a gate height and a spacer base, having a base height, between the glue gate and the lens plate. The glue ring is between the spacer ring and the top surface and has (i) an outer region between the top surface and a bottom surface of the spacer base, and (ii) an inner region, having an inner thickness, between the top surface and a bottom surface of the glue gate. The lens plate, the spacer ring, the glue ring, and the top surface form a sealed cavity having a cavity height equal to at least a sum of the inner thickness, the gate height, and the base height.

15 Claims, 6 Drawing Sheets

(56) References Cited

U.S. PATENT DOCUMENTS

2014/0191350 A1    7/2014  Chen et al.
2014/0355870 A1  12/2014  Venkataraman et al.
2016/0306265 A1  10/2016  Riel et al.
2017/0012069 A1    1/2017  Rudmann et al.

OTHER PUBLICATIONS

Final Rejection corresponding to U.S. Appl. No. 15/004,584, dated Oct. 18, 2017, 8 pages.
Non-Final Rejection corresponding to U.S. Appl. No. 15/004,584, dated Mar. 26, 2018, 9 pages.

* cited by examiner

NOTCHED-SPACER CAMERA MODULE AND METHOD FOR FABRICATING SAME

FIELD OF INVENTION

This disclosure relates to die-level alignment and bonding of wafer-level camera components, and particularly, designs that improve yield and simplify manufacture of wafer-level camera modules.

BACKGROUND

Wafer-level manufacture of camera modules manufactured with CMOS technologies has contributed to the incorporation of camera modules in high-volume consumer products such as mobile devices and motor vehicles. FIG. 1 is a cross-sectional view of such a prior-art camera module 100 in an ambient medium 102. Camera module 100 includes a lens 172 having an optical axis 173 aligned with an image sensor 125, where a spacer ring 160 separates lens 172 and image sensor 125. Lens 172 and image sensor 125 are part of lens plate 170 and device layer 120 respectively. Solder balls 110 are electrically connected to image sensor 125. Solder balls 110, device layer 120, and cover glass 130 form a chip-scale package 135, which is also referred to herein as image sensor chip-scale package 135 and CSP 135. Spacer ring 160 and lens plate 170 form a lens unit 175.

In a process for manufacturing camera module 100, optical axis 173 is aligned to image sensor 125. Spacer ring 160 has a bottom surface 165 and CSP 135 has a CSP top surface 136. A glue ring 140 bonds spacer ring 160 to cover glass 130, between bottom surface 165 and CSP top surface 136, to form a cavity 148. A drawback of prior-art camera module 100 is that in the bonding process, spacer ring 160 deforms glue ring 140 such that portions of glue ring 140 exit regions between spacer ring 160 and cover glass 130. Upon curing, glue ring 140 may not completely seal, or securely seal, cavity 148 from ambient medium 102. For example, in camera module 100, a top surface 141 of glue ring 140 is separated from bottom surface 165(1). A broken seal between cavity 148 and ambient medium 102 risks contamination of at least one of lens 172 and cover glass 130. To eliminate this risk, camera module 100 includes extra edge glue 146 to secure the sealing of cavity 148. Application of extra edge glue 146 increases manufacturing costs associated with camera module 100.

SUMMARY OF THE INVENTION

A notched-spacer camera module includes a chip-scale package (CSP), a lens unit, and a glue ring. The CSP has an image sensor and a CSP top surface, the lens unit has a lens plate and a spacer ring, and the lens plate includes a lens. The spacer ring includes (i) a glue gate having a gate height and (ii) a spacer base, having a base height, between the glue gate and the lens plate. The glue ring is between the spacer ring and the CSP top surface and has (i) an outer region between the CSP top surface and a bottom surface of the spacer base, and (ii) an inner region, having an inner thickness, between the CSP top surface and a bottom surface of the glue gate. The lens plate, the spacer ring, the glue ring, and the CSP top surface form a sealed cavity having a cavity height equal to at least a sum of the inner thickness, the gate height, and the base height.

A method for fabricating a notched-spacer camera module includes steps of (a) applying a glue ring, having a first thickness, to a top surface of a chip-scale package having an image sensor, and (b) aligning a lens to the image sensor, the lens being part of a lens plate attached to a spacer ring. The spacer ring has (i) a glue gate having a gate height less than the first thickness and (ii) a spacer base between the glue gate and the lens plate. The step of aligning includes longitudinally aligning the lens to the image sensor such that the glue ring is deformed and spans an inner region between the top surface of the chip-scale package and a bottom surface of the glue gate.

DETAILED DESCRIPTION OF THE EMBODIMENTS

Figure 1:
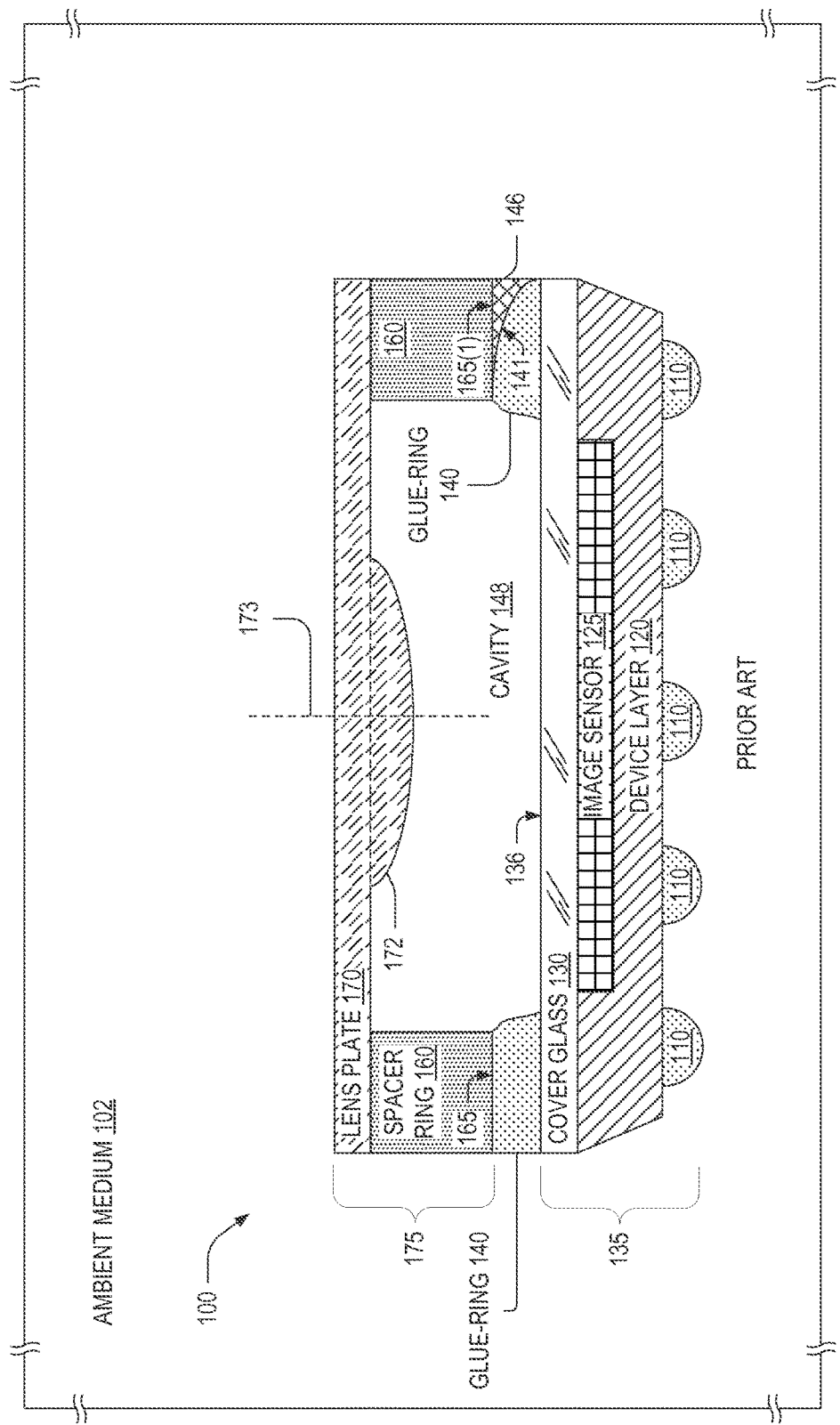
FIG. 1 is a cross-sectional view of a prior-art camera module.
Figure 2:
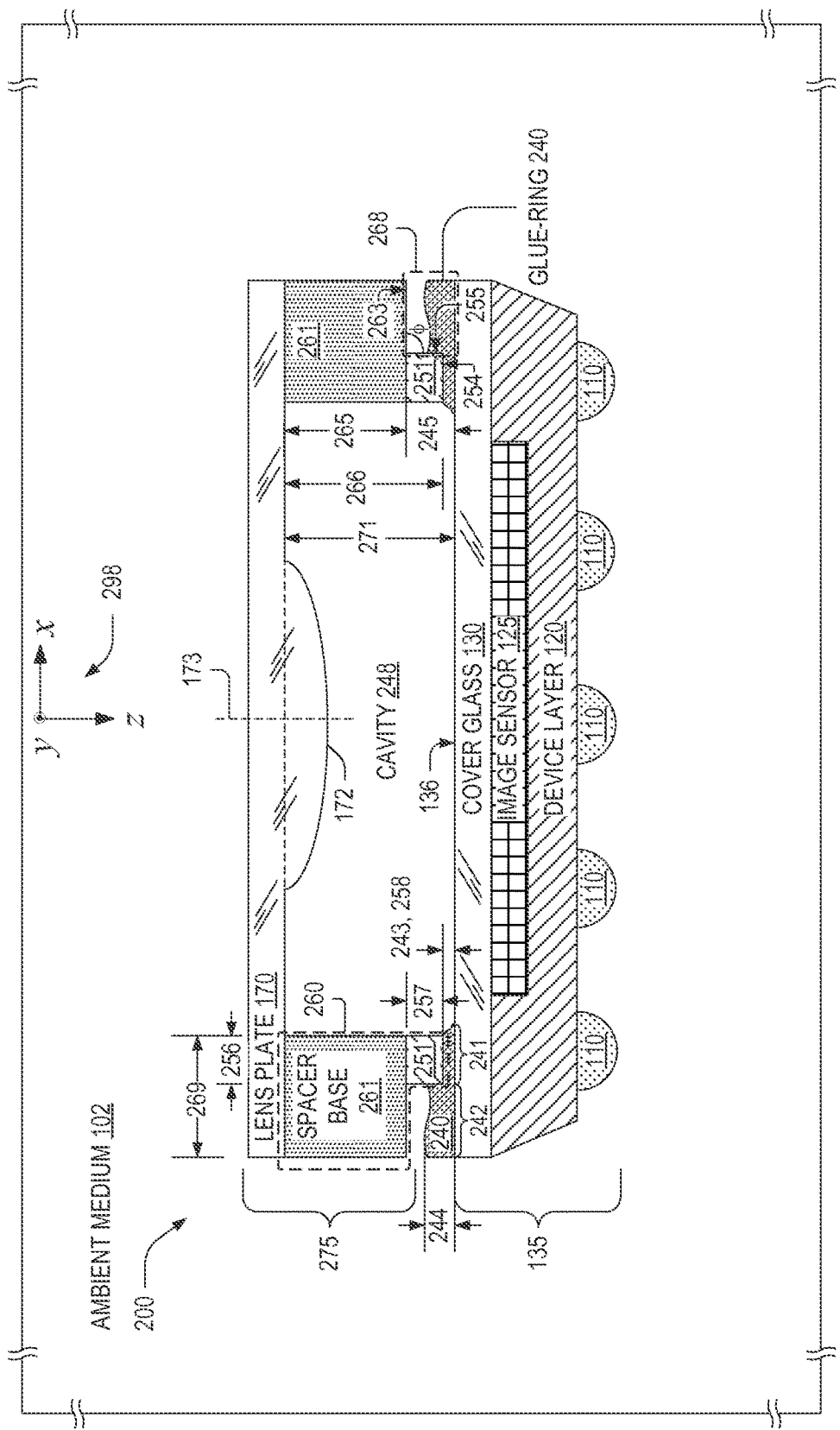
FIG. 2 is a cross-sectional view of a notched-spacer camera module, in an embodiment.

FIG. 2 is a cross-sectional view of an exemplary notched-spacer camera module 200. Like camera module 100, notched-spacer camera module 200 includes a spacer ring between lens plate 170 and chip-scale package 135. Whereas camera module 100 includes spacer ring 160 having bottom surface 165 that is planar, notched-spacer camera module 200 includes a notched-spacer ring 260 formed from a spacer base 261 and a glue gate 251. Spacer base 261 has a spacer-base bottom surface 263. Glue gate 251 has a bottom surface 254 and a side surface 255. Notched-spacer ring 260 and lens plate 170 form a lens unit 275. Lens plate 170 may include more than one lens without departing from the scope hereof.

Spacer base 261 and glue gate 251 may be formed of one or more of the following materials: glass, photoresist (e.g., dry-film solder mask), epoxy, silicon, and metal. Spacer base 261 and glue gate 251 may be formed of different materials or may be formed of the same material. Glue gate 251 may be bonded to spacer base 261 or attached thereto by other means known in the art. Alternatively, spacer base 261 and glue gate 251 may be formed of the same material, and from a single piece of material, such that notched-spacer ring 260 is a monolithic entity.

Spacer base has a base width 269 and glue gate 251 has a gate width 256. Spacer base has a base height 265 and glue gate 251 has a gate height 257 such that spacer base has a spacer height 266 that equals base height 265 plus gate height 257. Bottom surface 254 is at a height 258 above CSP top surface 136. Herein and unless otherwise specified, thicknesses and heights refer to spatial dimensions in the z-direction of a coordinate system 298, while widths refer to spatial dimensions in the x-direction.

In the embodiment of notched-spacer camera module 200 shown in FIG. 2, glue gate 251 is entirely beneath spacer base 261 and base width 269 exceeds gate width 256. While not shown in FIG. 2, in an embodiment, glue gate 251 extends into cavity 248 such that glue gate 251 is not entirely beneath spacer base 261. In such an embodiment, gate width 256 may exceed base width 269.

Referring to spacer base 261 and glue gate 251, spacer-base bottom surface 263, side surface 255, and CSP top surface 136, are boundaries of a glue trap region 268 partially occupied by part of a glue ring 240. Spacer-base bottom surface 263 and side surface 255 are shown as planar and meeting at an angle $\phi = 90°$ in FIG. 2. At least one of spacer-base bottom surface 263 and side surface 255 may be non-planar, and $\phi \neq 90°$ without departing from the scope hereof. For example, angle $\phi$ may be between sixty degrees and one hundred twenty degrees. In an embodiment, part of glue ring 240 completely fills glue trap region 268.

Glue ring 240 bonds notched-spacer ring 260 to a CSP top surface 136 of chip-scale package 135, which seals cavity 248 from ambient medium 102. Glue ring 240 is for example a ultra-violet curable epoxy. Glue ring 240 has an inner region 241 and an outer region 242. Inner region 241 has an inner thickness 243 and is at least partially between CSP top surface 136 and glue-gate bottom surface 254. Outer region 242 has a maximum outer thickness 244 and is at least partially between CSP top surface 136 and spacer-base bottom surface 263. FIG. 2 shows inner thickness 243 as equal to height 258. Inner region 241 may include one or more regions, not shown, having a thickness less than height 258 (and hence inner thickness 243), without departing from the scope hereof.

Maximum outer thickness 244 may exceed inner thickness 243, as shown in FIG. 2. Without departing from the scope hereof, at least one of: (a) inner thickness 243 may exceed or equal maximum outer thickness 244, and (b) maximum outer thickness 244 may exceed or equal gate height 257.

Spacer-base bottom surface 263 at a height 245 above CSP top surface 136. Height 245 is the sum of inner thickness 243 and gate height 257, and hence exceeds gate height 257. Cavity 248 has a cavity height 271 that is greater than or equal to the sum of inner thickness 243, gate height 257, and base height 265.

Notched-spacer ring 260 results in camera module 200 having several advantages over camera module 100 that improve yield and hence lowers manufacturing costs. These include a stronger bond between the chip-scale package and the lens unit, and a more secure seal of the cavity therebetween (e.g., cavity 248). Glue gate 251 decreases risk that glue ring 240 separates from notched-spacer ring 260 (at surfaces 254 and 255 for example), and hence also decreases risk of cavity 248 being exposed to contaminants in ambient medium 102.

Figure 3:
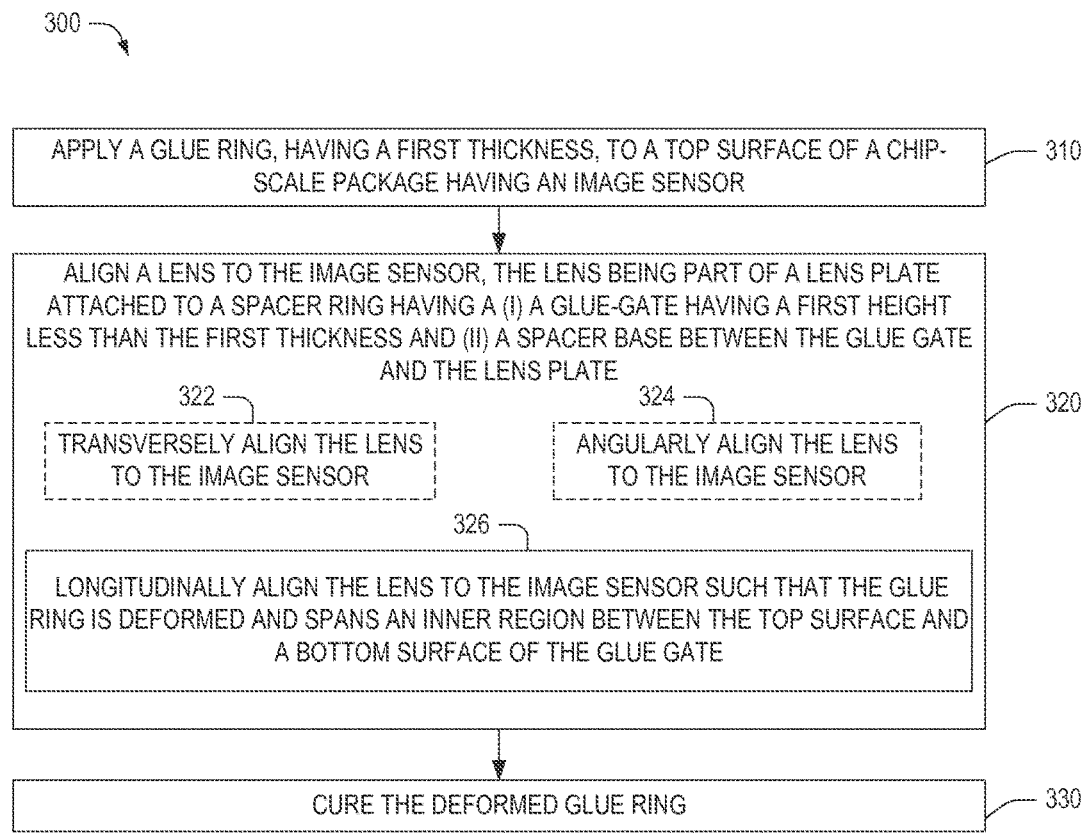
FIG. 3 is a flowchart illustrating a method for fabricating the notched-spacer camera module of FIG. 2, in an embodiment.
Figure 4A:
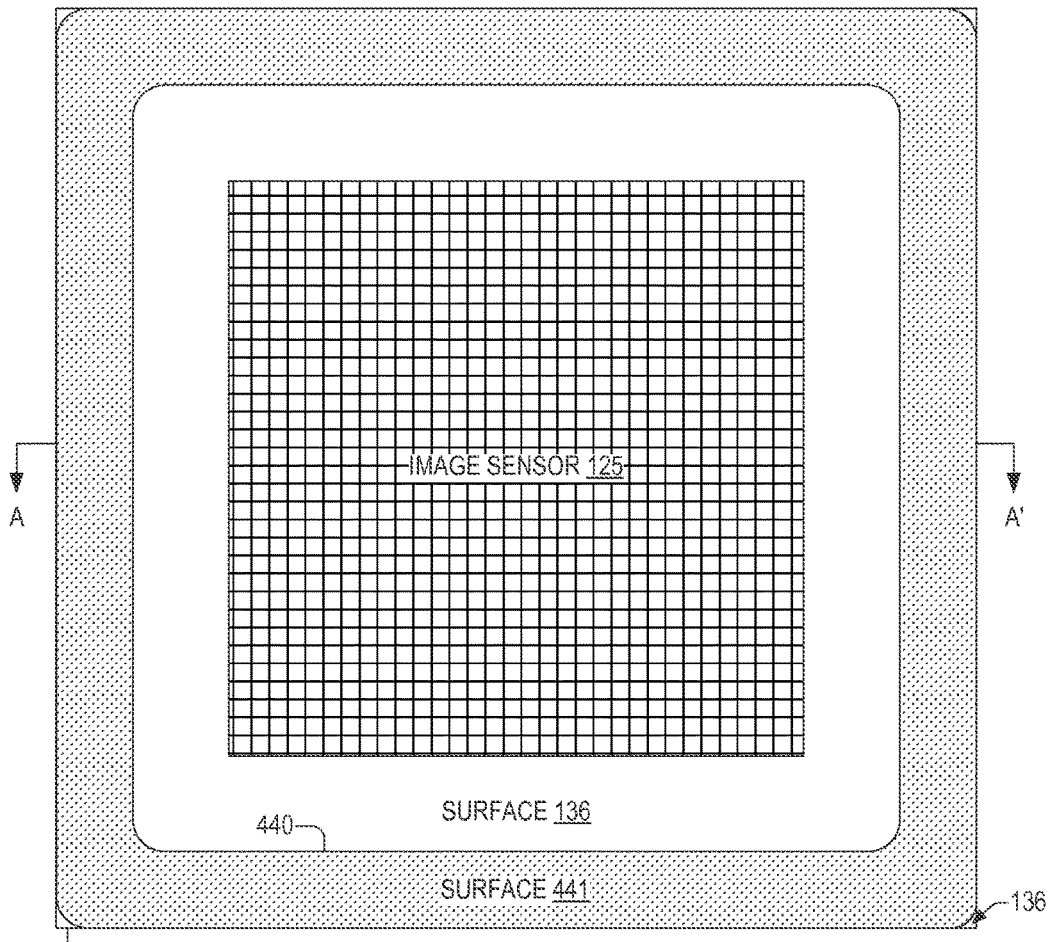
FIGS. 4A and 4B show a plan view and a cross-sectional view, respectively, of a glue ring on a top surface of an image sensor chip-scale package, in an embodiment.
Figure 4B:
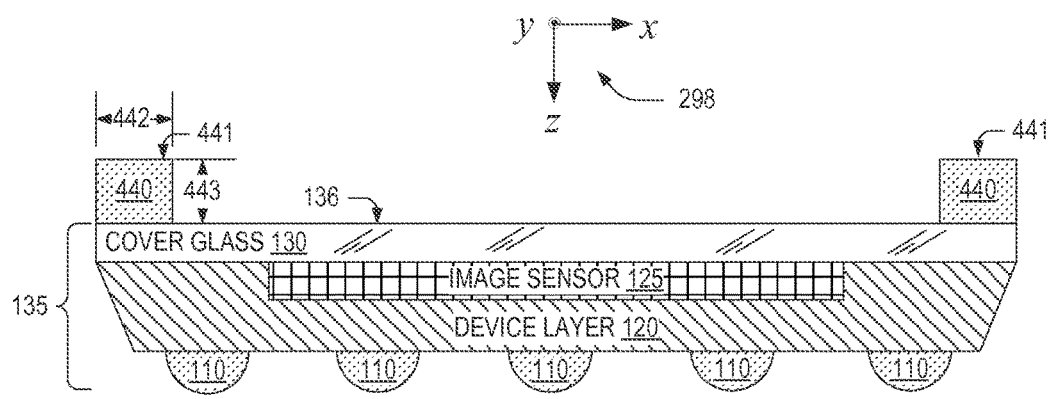

FIG. 3 is a flowchart illustrating a method 300 for fabricating a notched-spacer camera module 200. FIG. 4 shows views of the lens plate and chip-scale package, the views corresponding to steps of method 300. FIG. 3 and FIG. 4 are best viewed together with the following description.

In step 310, method 300 applies a glue ring, having a first thickness, to a top surface of a chip-scale package having an image sensor. In an example of step 310, a glue ring 440 is applied to CSP top surface 136 of chip-scale package 135, shown in FIGS. 4A and 4B in a plan view and a cross-sectional view, respectively. Glue ring 440 has a top surface 441, width 442, and a thickness 443. In an embodiment of notched-spacer camera module 200, thickness 443 is between 60 μm and 100 μm, and width 442 exceeds 100 μm. Cross-sectional view of FIG. 4B corresponds to cross-section A-A' of FIG. 4A. CSP top surface 136 corresponds to a top surface of cover glass 130.

In step 320, method 300 aligns a lens to the image sensor, the lens being part of a lens plate attached to a spacer ring having a (i) a glue gate having a first height less than the first thickness and (ii) a spacer base between the glue gate and the lens plate. Step 320 may viewed as including a longitudinal alignment step and optionally a transverse alignment step and an angular alignment step, as described below as step 326, step 322, and step 324, respectively. With respect to the x, y, and z axes of coordinate system 298; transverse alignment refers to degrees of freedom being positions along the x-axis and y-axis; angular alignment refers to degrees of freedom being angles around the x-axis and y-axis; and longitudinal alignment refers to a degree of freedom being position along the z-axis. Within step 320, steps 322, 324, and 326 may be each repeated multiple times in any sequence.

Step 320 may include employment of an alignment metric indicating degree of alignment between lens unit 275 and chip-scale package 135. An alignment metric is for example related to the modulation transfer function (MTF) of an image formed by lens 172 on image sensor 125.

Step 322 is optional. In step 322, method 300 transversely aligns the lens to the image sensor. In an example of step 322, lens 172 is transversely aligned to image sensor 125. Lens 172 is transversely aligned to image sensor 125 such that, for example, optical axis 173 is above a center pixel, or center group of pixels of image sensor 125.

Step 324 is optional. In step 324, method 300 angularly aligns the lens to the image sensor. In an example of step 324, lens 172 is angularly aligned to image sensor 125. Lens 172 may angularly aligned to image sensor 125 such that optical axis 173 is orthogonal to CSP top surface 136 of chip-scale package 135.

Figure 5A:
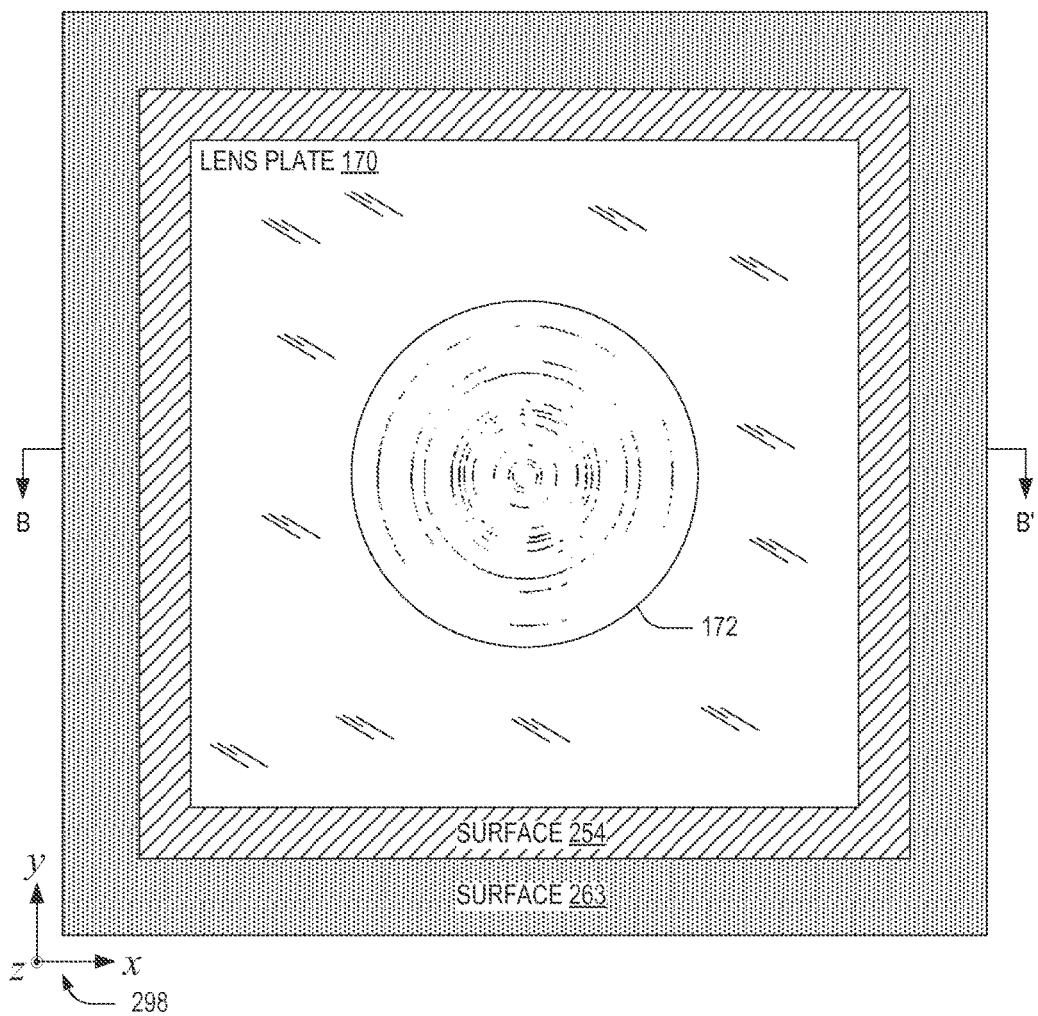
FIGS. 5A and 5B show a bottom plan view and a corresponding cross-sectional view, respectively, of a lens unit transversely aligned above the chip-scale package of FIG. 4, in an embodiment.
Figure 5B:
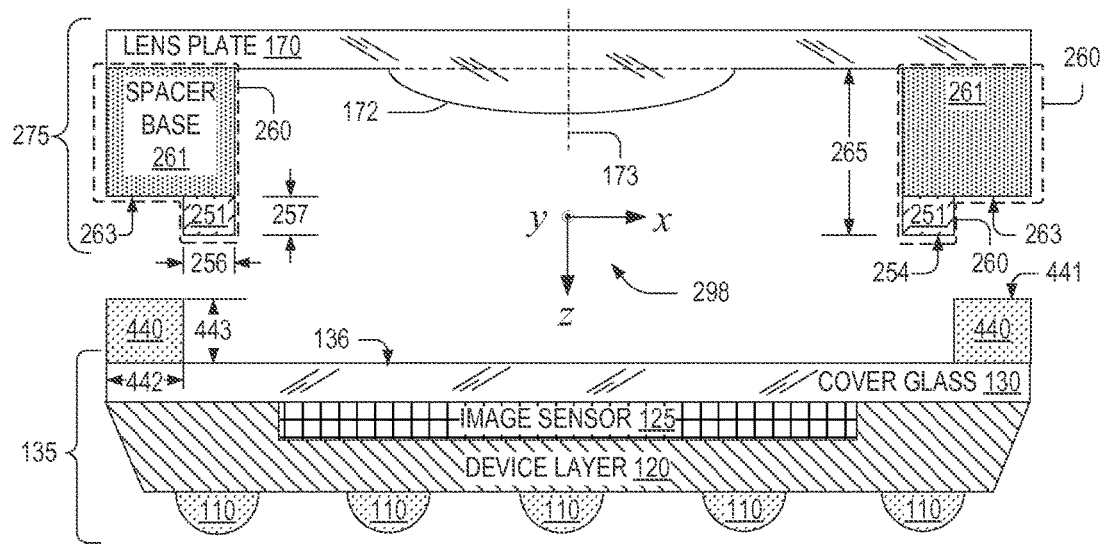

FIGS. 5A and 5B show a bottom plan view and a corresponding cross-sectional view, respectively, of lens unit 275 transversely aligned above chip-scale package 135. Cross-sectional view of FIG. 5B corresponds to cross-section B-B' of FIG. 5A. In an embodiment, gate width 256 is less than width 442. In an embodiment, gate height 257 of glue gate 251 is less than thickness 443.

In step 326, method 300 longitudinally aligns the lens to the image sensor such that the glue ring is deformed and spans an inner region between the top surface and a bottom surface of the glue gate. In an example of step 326, lens 172 is longitudinally aligned to image sensor 125 such that glue ring 440 is deformed to become a deformed glue ring 640 shown in FIG. 6.

In an embodiment, in step 326, method 300 longitudinally aligns the lens to the image sensor such that the glue ring also spans an outer region, having an outer thickness smaller than the first thickness (of the glue ring), between the top surface and a bottom surface of the spacer base.

Figure 6:
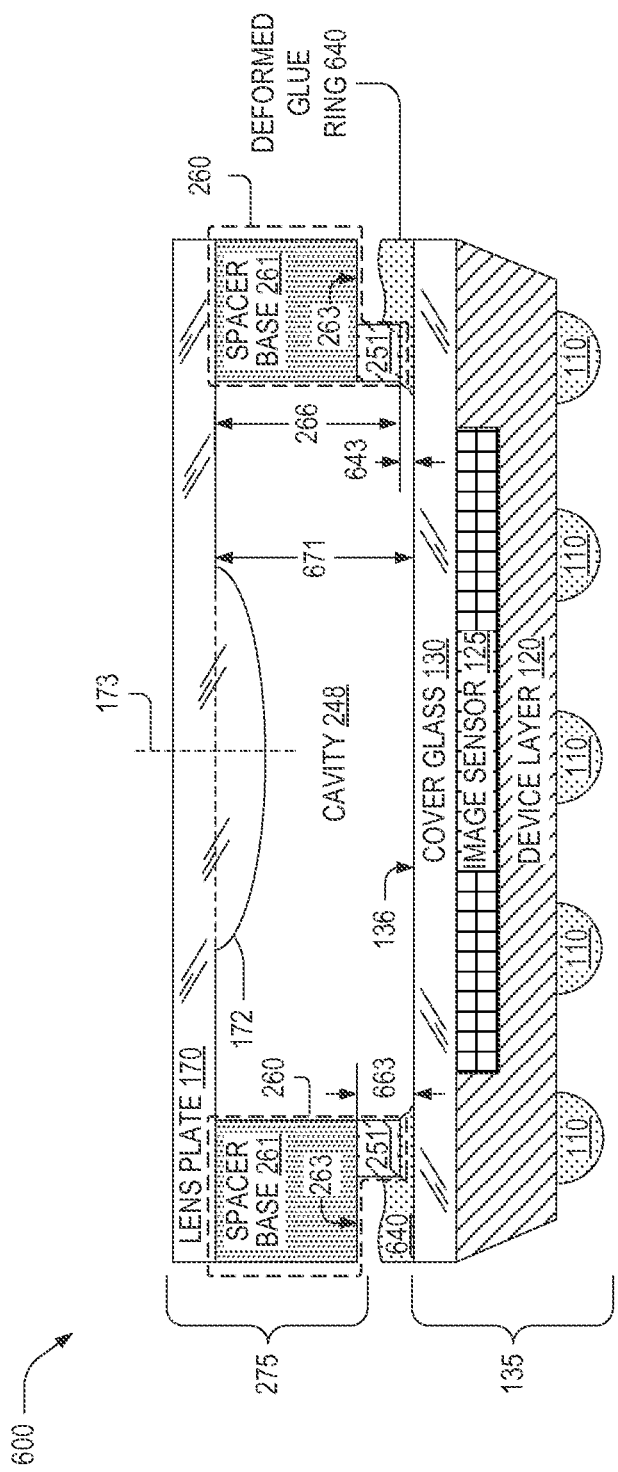
FIG. 6 is a cross-sectional view of a notched-spacer camera module formed from after longitudinally aligning the lens unit of FIGS. 5A and 5B to the chip-scale package of FIG. 4, in an embodiment.

FIG. 6 is a cross-sectional view of a notched-spacer camera module 600 with lens unit 275 on chip-scale package 135 after longitudinal alignment of step 326. Spacer-base bottom surface 263 is at a height 663 above CSP top surface 136. Height 663 is less than thickness 443 of glue ring 440.

Deformed glue ring 640 has an inner thickness 643 that is greater than zero. In an example of step 326, method 300 longitudinally aligns lens 172 to determine a pre-cure cavity height 671 between lens plate and CSP top surface 136 that optimizes an image quality metric of an image formed on image sensor 125 by lens 172. The image quality metric is for example related to a value of an MTF corresponding to at least one spatial frequency and optical wavelength. The value of inner thickness 643 is at least in part determined by the pre-cure cavity height 671 that optimizes an image quality metric. Inner thickness 643 hence provides a degree of freedom when optimizing image quality that would not be available if method 300 included bonding lens unit 275 to chip-scale package 135 such that bottom surface 254 of glue gate 251 (FIG. 5) was in contact with CSP top surface 136, such that spacer height 266 would be the only attainable value of pre-cure cavity height 671.

In step 326, glue gate 251 prevents glue of glue ring 240 from bleeding to cavity 248 and covering a portion of image sensor 125. Eliminating this failure mode of prior-art camera module 100 results in improved yield of camera module 200.

Step 330 is optional. If included, in step 330, method 300 cures the deformed glue ring. In an example of step 340, deformed glue ring 640 is cured to form glue ring 240 and yield notched-spacer camera module 200 of FIG. 2. Deformed glue ring 640 is cured, for example, by an ultra-violet light source.

Camera module 200 has a cavity height 271, which may differ from pre-cure cavity height 671 depending on, for example, any difference in inner thickness 643 and inner thickness 243 of deformed glue ring 640 and glue ring 240 respectively. In step 326, pre-cure cavity height 671 may also be optimized to compensate for any differences between inner thickness 643 and inner thickness 243.

Combinations of Features

Features described above as well as those claimed below may be combined in various ways without departing from the scope hereof. The following examples illustrate some possible, non-limiting combinations:

(A1) A notched-spacer camera module includes a chip-scale package (CSP), a lens unit, and a glue ring. The CSP has an image sensor and a CSP top surface; the lens unit has a lens plate and a spacer ring; and the lens plate includes a lens. The spacer ring includes (i) a glue gate having a gate height and (ii) a spacer base, having a base height, between the glue gate and the lens plate. The glue ring is between the spacer ring and the CSP top surface and has (i) an outer region between the CSP top surface and a bottom surface of the spacer base, and (ii) an inner region, having an inner thickness, between the CSP top surface and a bottom surface of the glue gate. The lens plate, the spacer ring, the glue ring, and the CSP top surface form a sealed cavity having a cavity height equal to at least a sum of the inner thickness, the gate height, and the base height.

(A2) In the notched-spacer camera module denoted by (A1), the glue gate may have a gate width less than a width of the glue ring.

(A3) In a notched-spacer camera module denoted by one of (A1) and (A2), the glue gate may have a gate width less that a width of the spacer base.

(A4) In any of the notched-spacer camera modules denoted by (A1) through (A3), the inner region may span the CSP top surface and the bottom surface of the glue gate.

(A5) In any of the notched-spacer camera modules denoted by (A1) through (A4), the outer region may span the CSP top surface and the bottom surface of the spacer base.

(A6) In any of the notched-spacer camera modules denoted by (A1) through (A5), the inner thickness may be less than a maximum thickness of the outer region of the glue ring.

(A7) In any of the notched-spacer camera modules denoted by (A1) through (A6), the spacer base may have a bottom surface at a height above the CSP top surface equal to a sum of the inner thickness and the gate height (A8) In any of the notched-spacer camera modules denoted by (A1) through (A7), the cavity height may be equal to the sum of the inner thickness, the gate height, and the base height.

(A9) In any of the notched-spacer camera modules denoted by (A1) through (A8), the outer region may have a maximum outer thickness exceeding the gate height.

(B1) A method for fabricating a notched-spacer camera module includes steps of (a) applying a glue ring, having a first thickness, to a top surface of a chip-scale package having an image sensor, and (b) aligning a lens to the image sensor, the lens being part of a lens plate attached to a spacer ring. The spacer ring has (i) a glue gate having a gate height less than the first thickness and (ii) a spacer base between the glue gate and the lens plate. The step of aligning includes longitudinally aligning the lens to the image sensor such that the glue ring is deformed and spans an inner region between the top surface of the chip-scale package and a bottom surface of the glue gate.

(B2) In the method denoted by (B1), the step of longitudinally aligning may result in the glue ring also spanning an outer region, having an outer thickness smaller than the first thickness, between the top surface of the chip-scale package and a bottom surface of the spacer base.

(B3) In any method denoted by one of (B1) and (B2), the step of aligning may further include transversely aligning the lens to the image sensor.

(B4) In any of the methods denoted by (B1) through (B3), the step of aligning may further include angularly aligning the lens to the image sensor.

(B5) Any of the methods denoted by (B1) through (B4) may further include curing the deformed glue ring.

(B6) In the method denoted as (B5), the step of curing may form a sealed cavity having a cavity height equal to at least a sum of the inner thickness, the gate height, and the base height.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A notched-spacer camera module comprising:
 a chip-scale package (CSP) having an image sensor and a CSP top surface;
 a lens unit having a lens plate and a spacer ring, the lens plate including a lens, and the spacer ring including
  (i) a protrusion having (a) a protrusion-bottom surface proximate the CSP top surface, (b) a protrusion-top surface thereopposite and proximate the lens plate, and (c) a protrusion-thickness equal to a distance between the protrusion-bottom surface and the protrusion-top surface, and
  (ii) a spacer base, having a base height, between the protrusion and the lens plate; and
 a glue ring between the spacer ring and the CSP top surface, having (i) an outer region between the CSP top surface and a bottom surface of the spacer base, and (ii) an inner region, between the CSP top surface and the protrusion-bottom surface and having an inner thickness less than a maximum thickness of the outer region;

the lens plate, the spacer ring, the glue ring, and the CSP top surface forming a sealed cavity having a cavity height equal to at least a sum of the inner thickness, the protrusion thickness, and the base height.

2. The notched-spacer camera module of claim 1, the protrusion having a width less than a width of the glue ring.

3. The notched-spacer camera module of claim 1, the protrusion having a width less that a width of the spacer base.

4. The notched-spacer camera module of claim 1, the inner region spanning the CSP top surface and the protrusion-bottom surface.

5. The notched-spacer camera module of claim 1, the outer region spanning the CSP top surface and the bottom surface of the spacer base.

6. The notched-spacer camera module of claim 1, the spacer ring including:
- an inner region having (a), in a first direction parallel to an optical axis of the lens, an inner thickness equal or exceeding a sum of the base height and the protrusion thickness, and (b) opposing surfaces defining a width of the cavity in a second direction perpendicular to the first direction; and
- an outer region surrounding the inner region and having, in the first direction, an outer thickness equal to the base height.

7. The notched-spacer camera module of claim 1, the spacer base having a bottom surface at a height above the CSP top surface equal to a sum of the inner thickness and the protrusion thickness.

8. The notched-spacer camera module of claim 1, the cavity height being equal to the sum of the inner thickness, the protrusion thickness, and the base height.

9. The notched-spacer camera module of claim 1, the outer region having a maximum outer thickness exceeding the protrusion thickness.

10. A method for fabricating a notched-spacer camera module comprising:
- applying a glue ring, having a first thickness, to a CSP top surface of a chip-scale package having an image sensor; and
- aligning a lens to the image sensor, the lens being part of a lens plate attached to a spacer ring having
  (i) a protrusion having (a) a protrusion-bottom surface proximate the CSP top surface, (b) a protrusion-top surface thereopposite and proximate the lens plate, and (c) a protrusion-thickness less than the first thickness and equal to a distance between the protrusion-bottom surface and the protrusion-top surface, and
  (ii) a spacer base between the protrusion and the lens plate, the step of aligning including:
    longitudinally aligning the lens to the image sensor such that the glue ring is deformed and spans an inner region, between the CSP top surface and the protrusion-bottom surface, that has an inner thickness less than a maximum thickness of the glue ring between the CSP top surface and the spacer base.

11. The method of claim 10, the first thickness defining the glue ring's height above the top surface, the step of longitudinally aligning resulting in the glue ring also spanning an outer region and having an outer thickness between the CSP top surface and a bottom surface of the spacer base, the outer thickness being less than the first thickness of the glue ring.

12. The method of claim 10, the step of aligning further comprising transversely aligning the lens to the image sensor.

13. The method of claim 10, the step of aligning further comprising angularly aligning the lens to the image sensor.

14. The method of claim 10, further comprising curing the deformed glue ring.

15. The method of claim 14, the step of curing forming a sealed cavity having a cavity height equal to at least a sum of the inner thickness, the protrusion thickness, and the base height.

* * * * *